Feb. 20, 1951 H. M. McCOY 2,542,042
INTEGRATED MODEL AIRPLANE
Filed Feb. 16, 1944 9 Sheets-Sheet 1
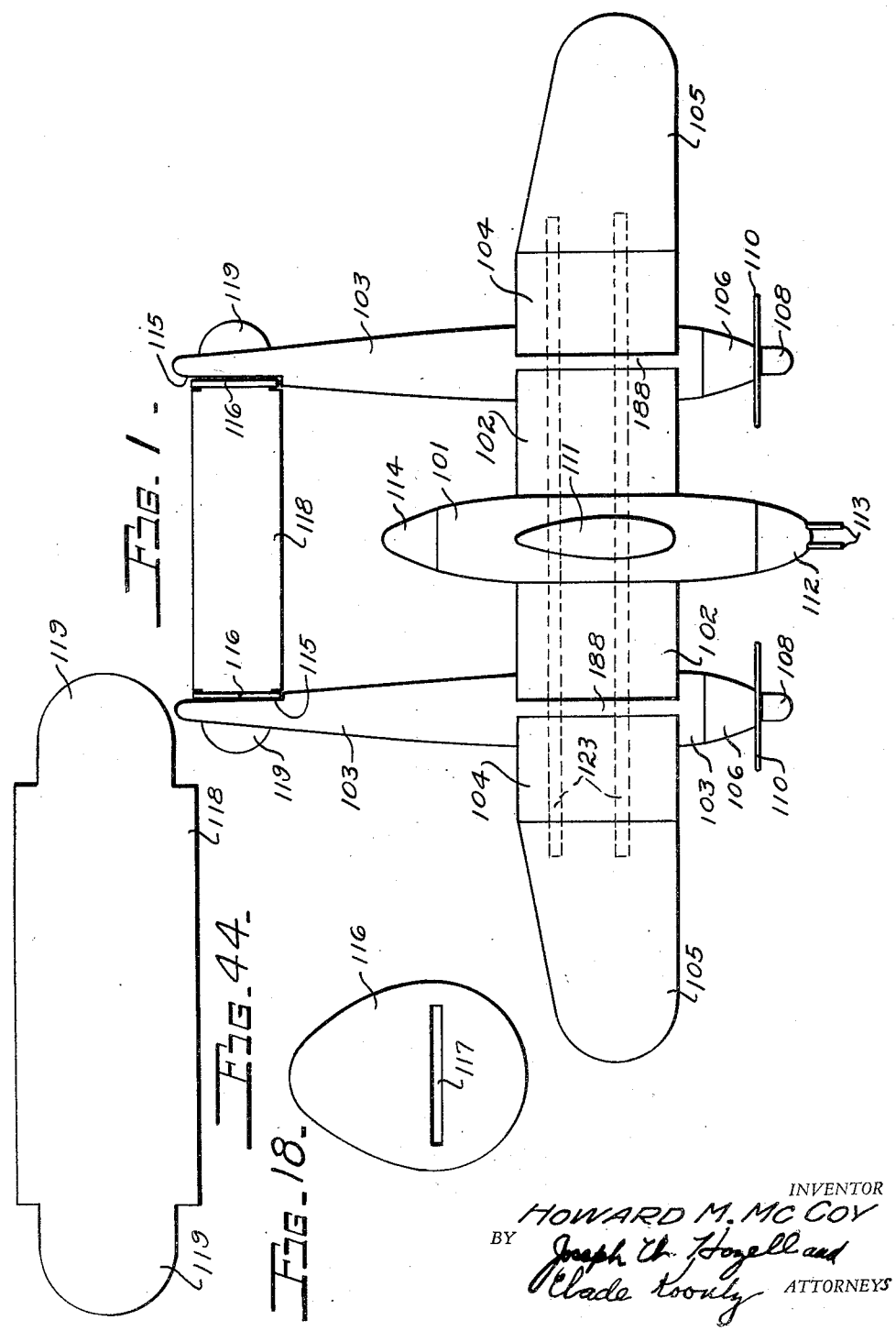
INVENTOR
HOWARD M. McCOY
BY Joseph C. Hozell and
Clade Koonly ATTORNEYS

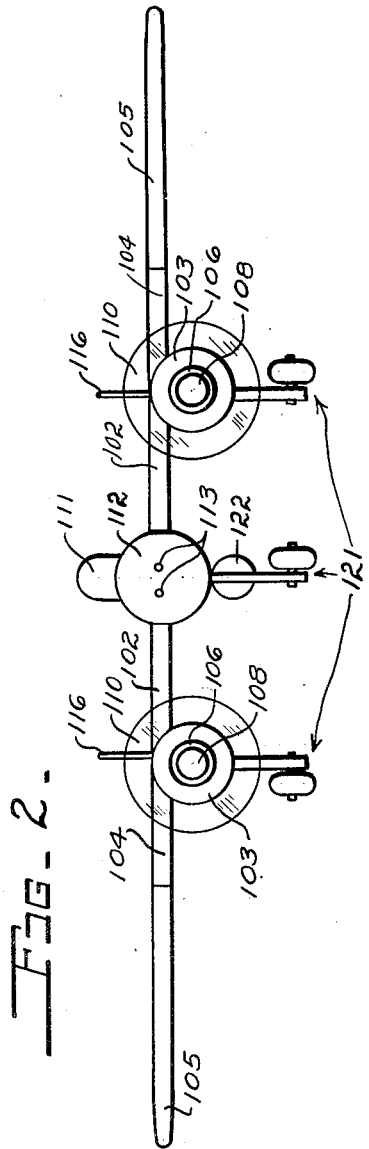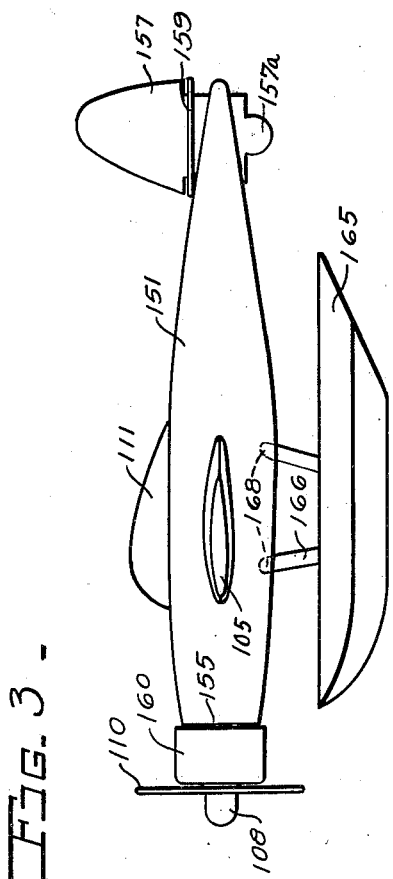

Feb. 20, 1951 H. M. McCOY 2,542,042
INTEGRATED MODEL AIRPLANE
Filed Feb. 16, 1944 9 Sheets-Sheet 3
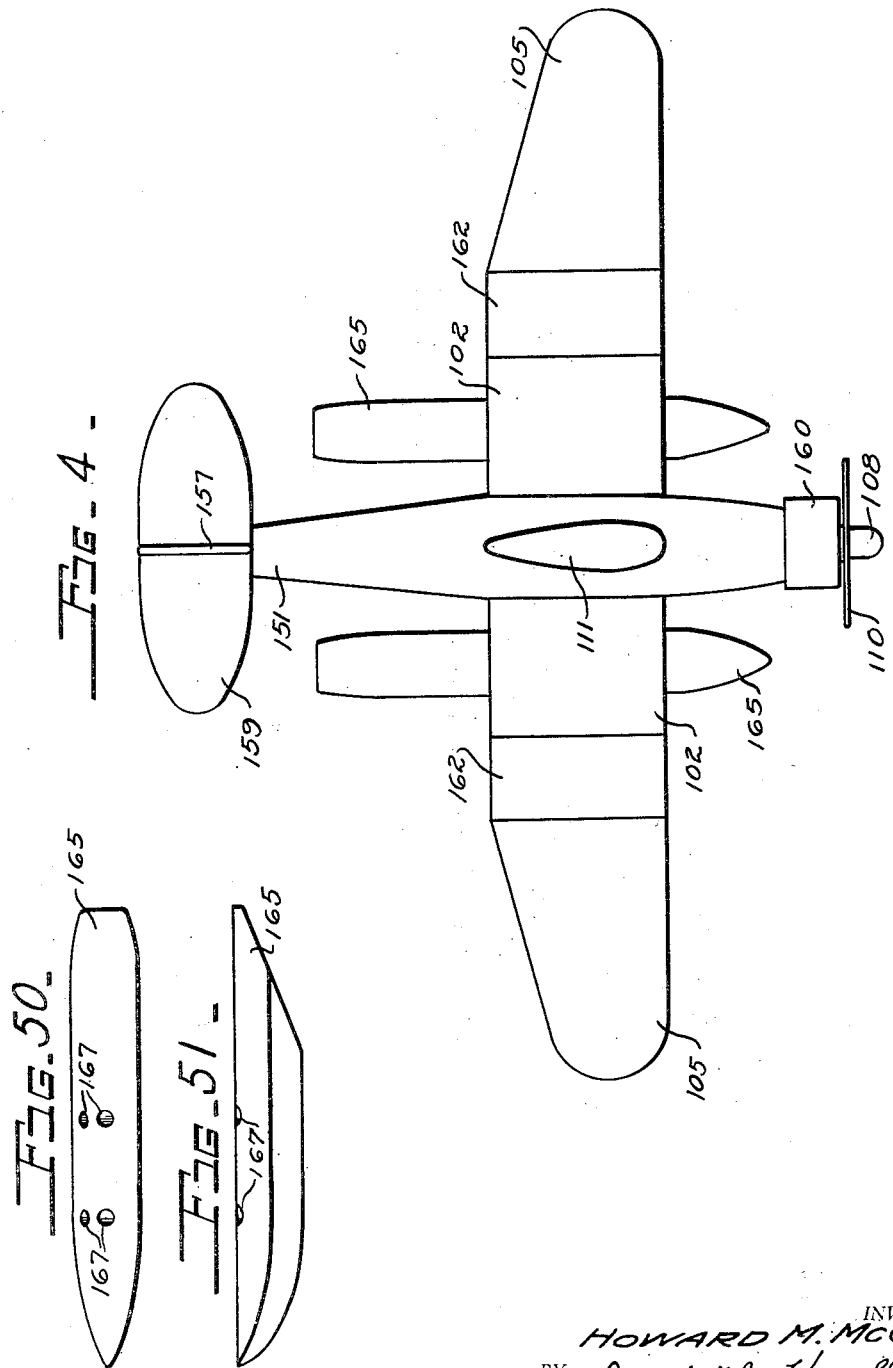
INVENTOR
HOWARD M. McCOY
BY
Joseph Th. Hazell
and
Clade Koontz ATTORNEYS Feb. 20, 1951     H. M. McCOY     2,542,042
INTEGRATED MODEL AIRPLANE
Filed Feb. 16, 1944     9 Sheets-Sheet 4
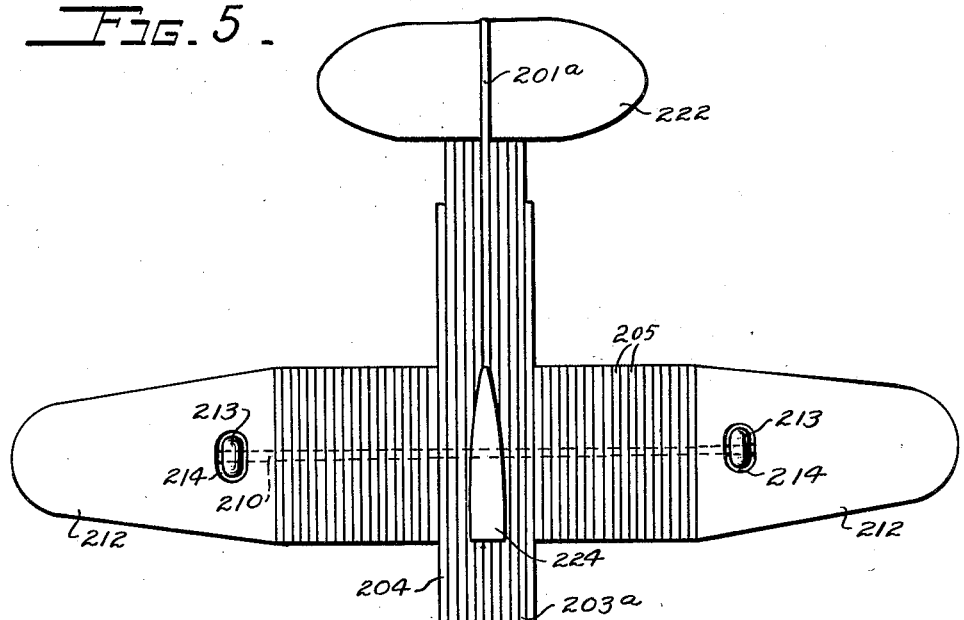
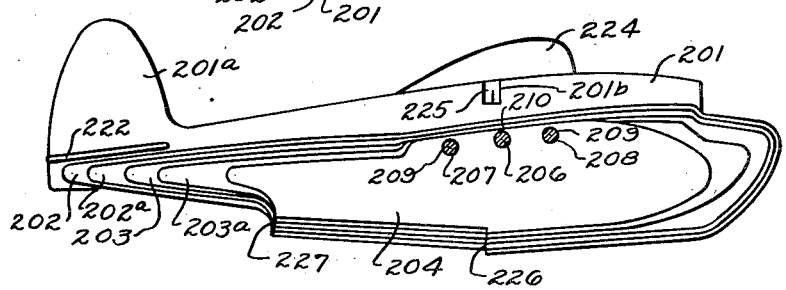
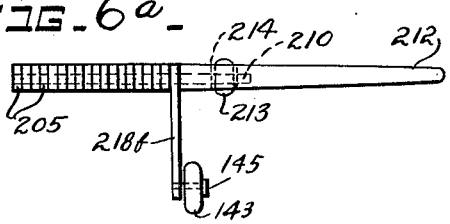
INVENTOR
HOWARD M. McCOY
BY
ATTORNEYS

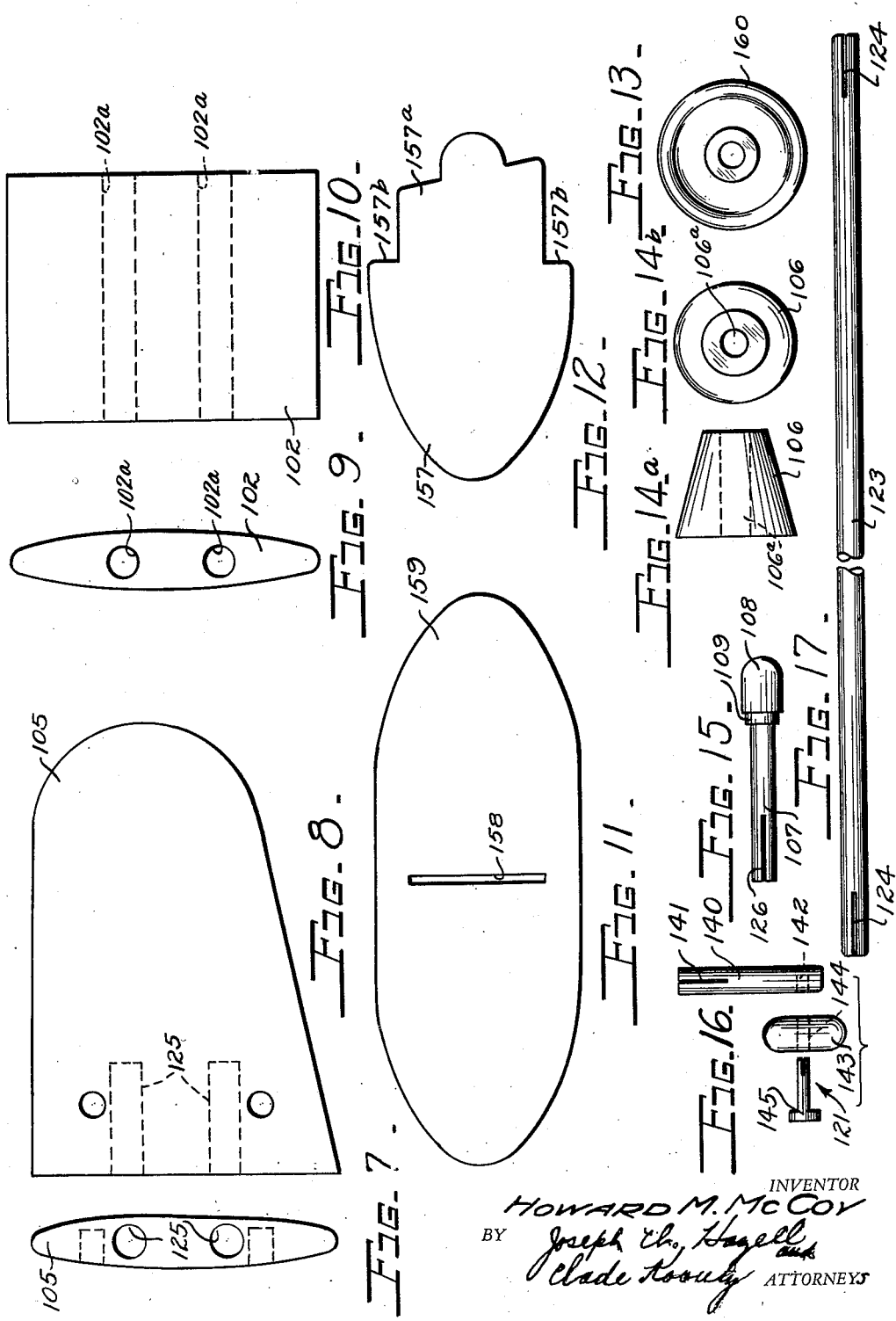

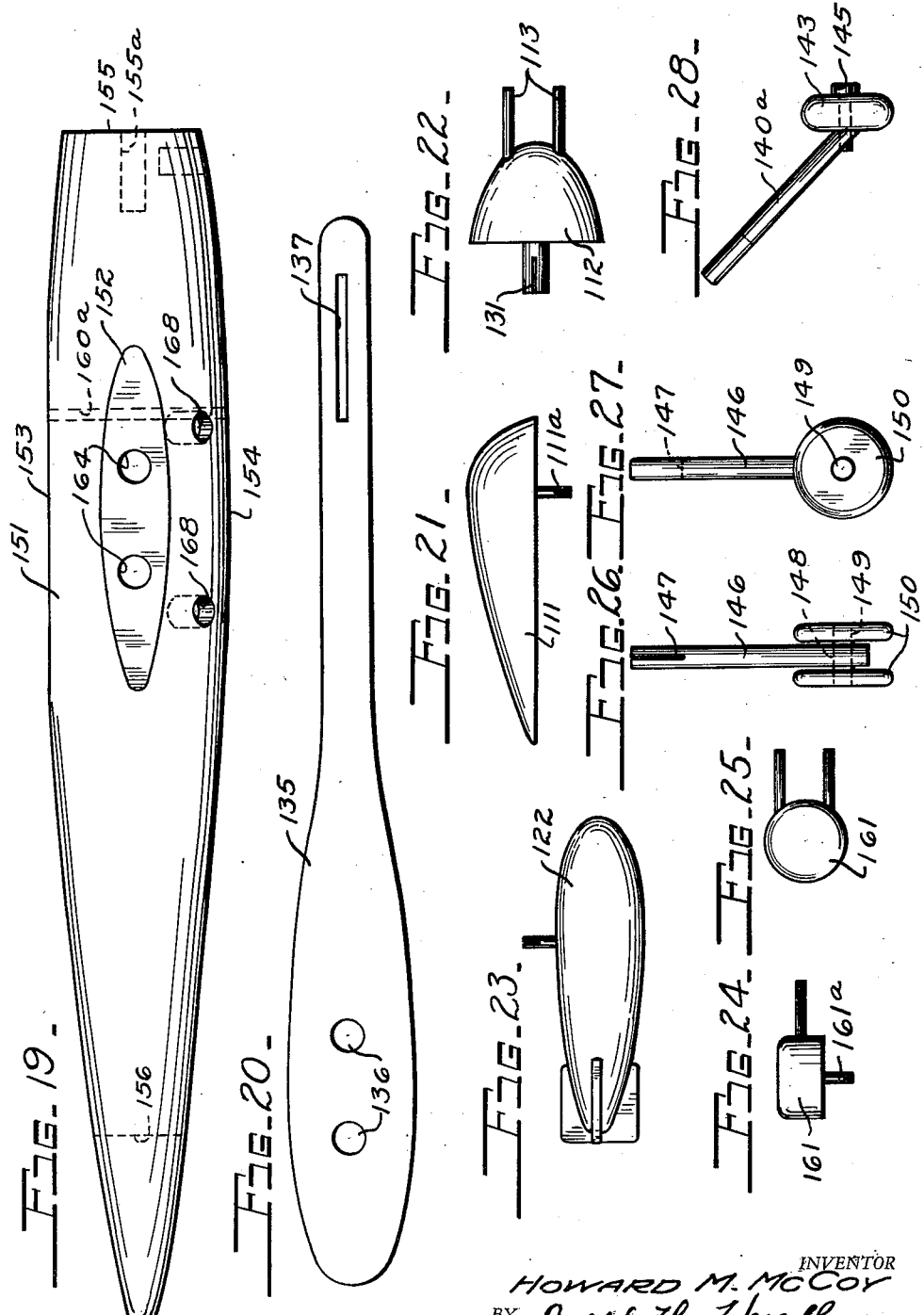

Feb. 20, 1951 H. M. McCOY 2,542,042
INTEGRATED MODEL AIRPLANE
Filed Feb. 16, 1944 9 Sheets-Sheet 7
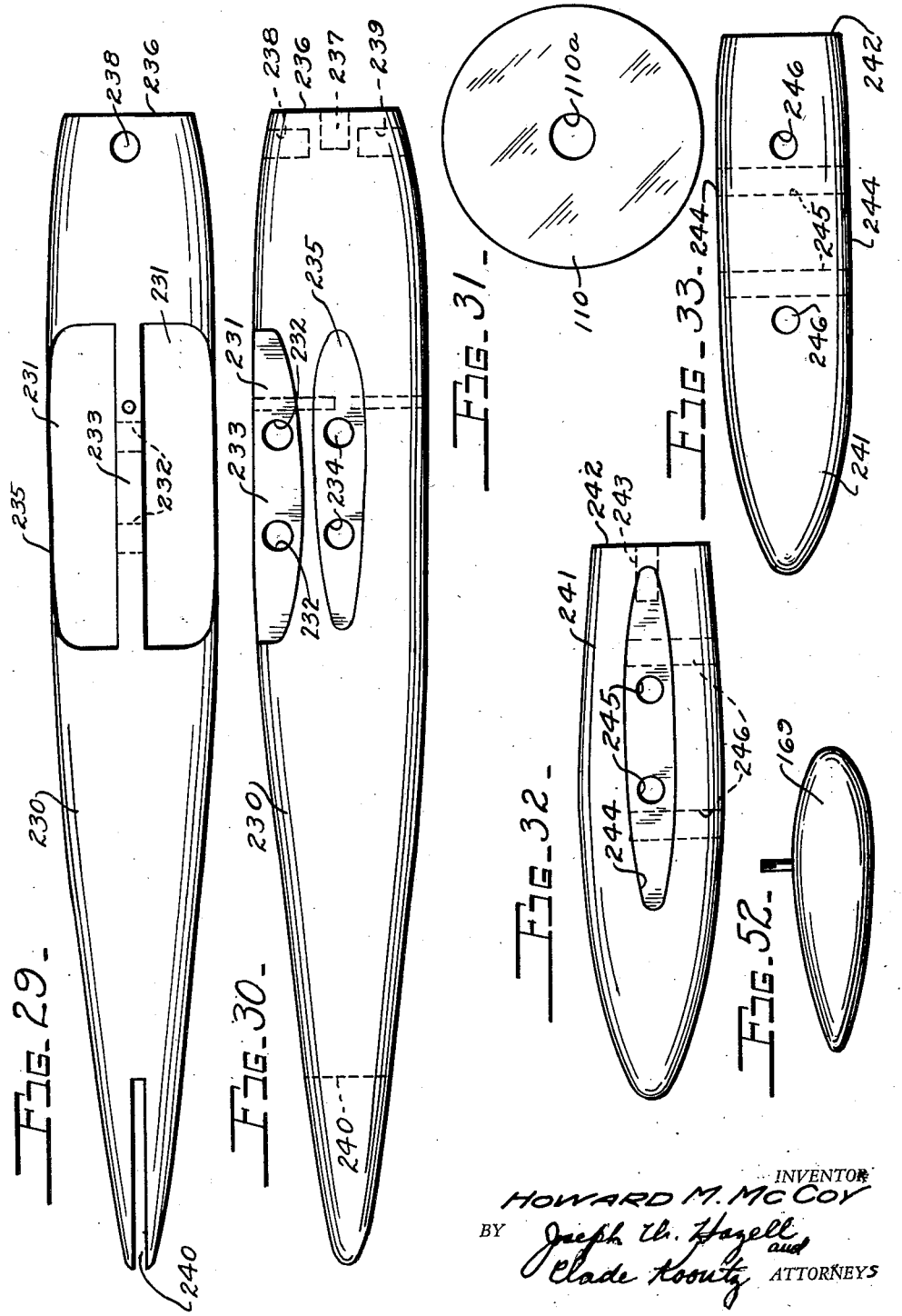
INVENTOR
HOWARD M. McCOY
BY Joseph Th. Hazell
and Clade Koontz ATTORNEYS Feb. 20, 1951  H. M. McCOY  2,542,042
INTEGRATED MODEL AIRPLANE
Filed Feb. 16, 1944  9 Sheets-Sheet 8
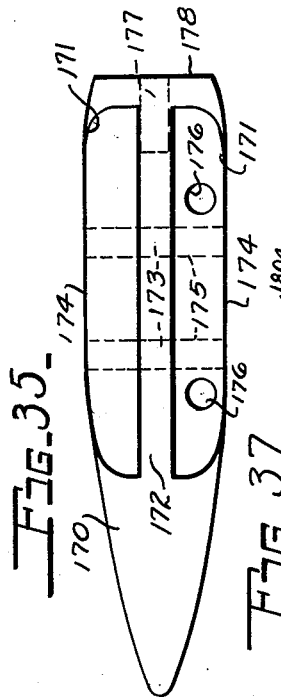
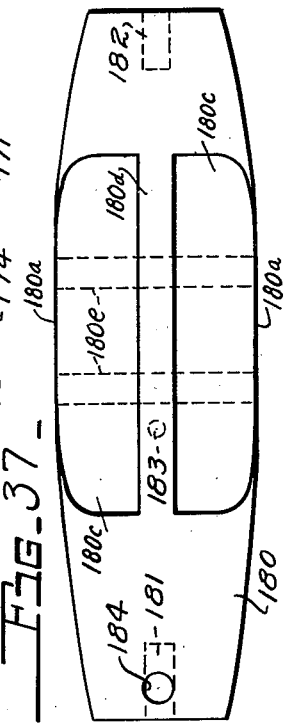
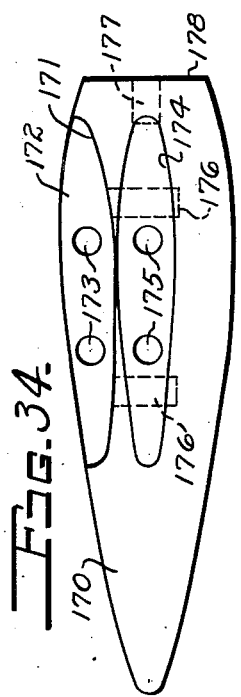
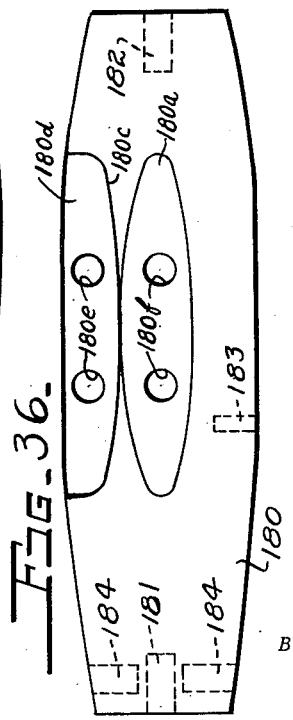
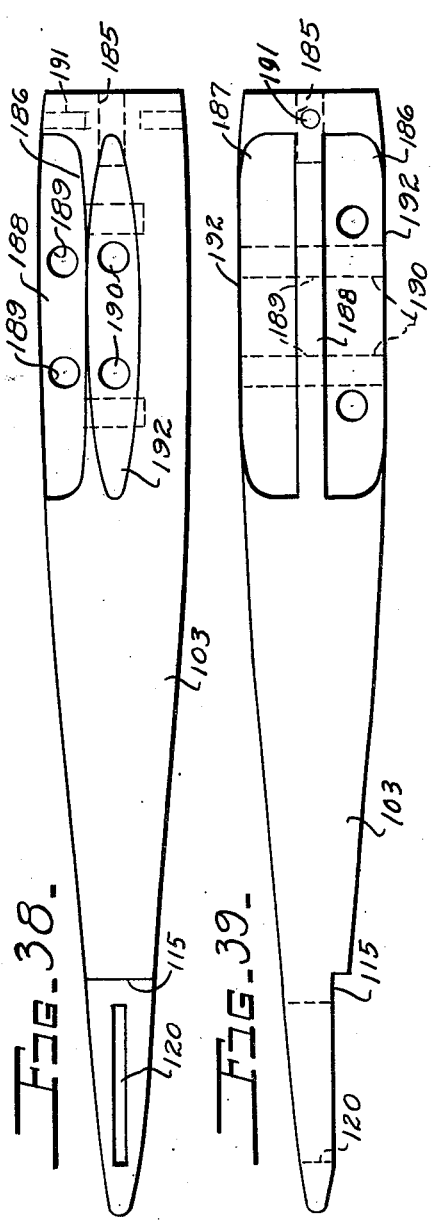
INVENTOR
HOWARD M. McCOY
BY
ATTORNEYS Feb. 20, 1951      H. M. McCOY      2,542,042
INTEGRATED MODEL AIRPLANE
Filed Feb. 16, 1944      9 Sheets-Sheet 9
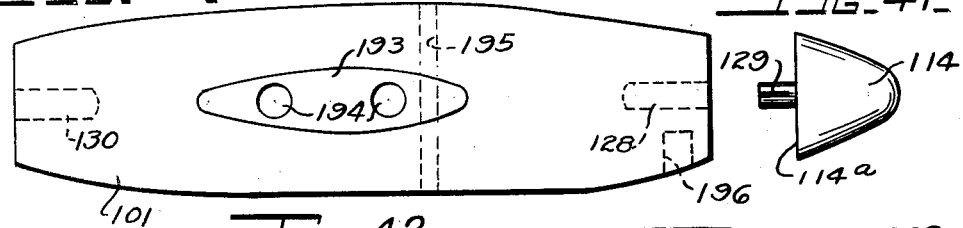
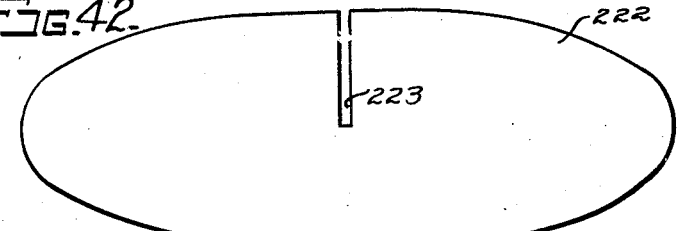
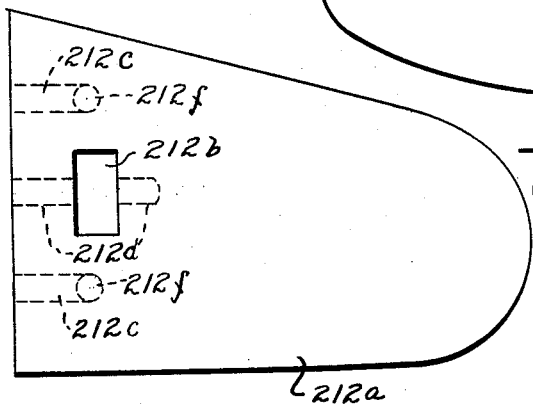
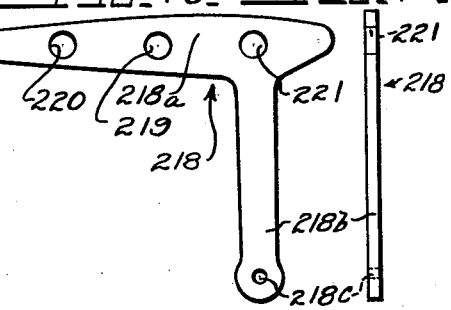
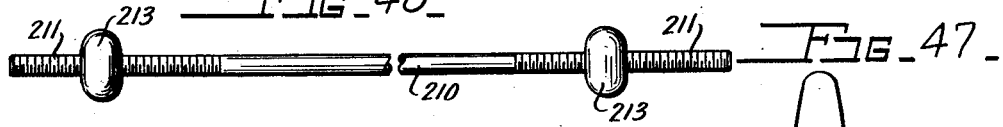
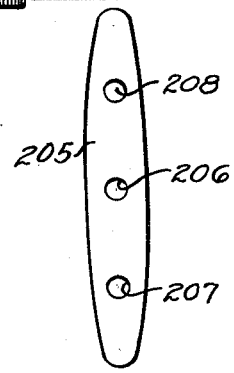
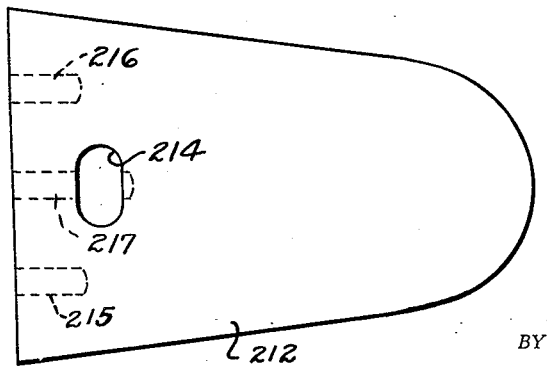
INVENTOR
HOWARD M. McCOY
BY
ATTORNEYS Patented Feb. 20, 1951

2,542,042

UNITED STATES PATENT OFFICE 2,542,042

INTEGRATED MODEL AIRPLANE

Howard M. McCoy, Fairfield, Ohio

Application February 16, 1944, Serial No. 522,611

9 Claims. (Cl. 46—17)

(Granted under the act of March 3, 1883, as amended April 30, 1928; 370 O. G. 757)

The invention described herein may be manufactured and used by or for Government for governmental purposes, without the payment to me of any royalty thereon.

This invention relates to integrated model airplanes, and aims to provide a set of model airplane parts which are so made that they may be easily assembled to simulate a large number of different military, naval, commercial and pleasure airplanes. The invention therefore provides aircraft model builders' parts which may make an interesting and instructive toy set, also a set useful for educating the armed forces and civilian defense personnel to recognize or spot airplanes of enemy or allied countries as well as friendly airplanes, since the silhouette or form of nearly all types of planes may be approximated. A further object is to provide a set of model airplane parts, especially for youths, boy scouts, etc., which may be assembled in accordance with the ingenuity and designing skill of the owner, to provide model airplanes not yet known. Another object is to provide an erecting set of model airplane parts which are readily assembled and disassembled without any tools. According to one form of the invention, however, the airplane parts are principally wood plies or laminae, designed to be secured together and then shaped to the proper contour, with a minimum of cutting or grinding. So far as possible, the airplane parts are simplified and made reversible so that persons unfamiliar with the parts may assemble them with few mistakes.

Further objects are to provide a set of model airplane parts which may be manufactured easily and at low cost, which are adequately strong to withstand most of the abuse that children normally give to toys, but which are so simple that repairs may be made, in case of necessity, by any person moderately skilled in the use of a penknife or other ordinary woodworking tools. Other objects will be understood from the following description of several embodiments of the invention shown in the accompanying drawings.

The present invention is an improvement over the constructions shown in my Patents No. 2,297,712, dated October 6, 1942 and No. 2,354,392, dated July 25, 1944.

In said drawings,

Fig. 1 is a top plan view of a model airplane simulating a twin boom bomber, made from model airplane parts in accordance with the invention;

Fig. 2 is a front elevation of the same;

Fig. 3 is a side elevation of a model airplane with floats or pontoons;

Fig. 4 is a top plan view thereof;

Fig. 5 is a top plan view of a model amphibian made from laminations or plies, the model being shown unfinished.

Fig. 6 is a side elevation thereof, the wing being omitted;

Fig. 6a is a detail in elevation showing a wing of the model of Fig. 5, with a landing gear attached to the wing.

Fig. 7 is an end view of a wing tip section;

Fig. 8 is a top plan view of the same;

Fig. 9 is an end view and Fig. 10, a top view of an intermediate wing section;

Fig. 11 is a plan view of a horizontal stabilizer;

Fig. 12 is an elevation of a vertical stabilizer;

Fig. 13 is an end elevation of a knob simulating a radial engine;

Fig. 14a is a side elevation of a knob simulating an in-line engine;

Fig. 14b is an end elevation of the same,

Fig. 15 is an elevation of one of the pins for securing the propellers and other parts to the model airplanes;

Fig. 16 is an exploded view, in elevation, of one of the landing gear assemblies;

Fig. 17 is a view of one of the long pins which extend through the fuselage and wings to bind the parts together;

Fig. 18 is an elevation of a nose piece or tail piece for attachment to a fuselage, as in the model of Fig. 1;

Fig. 19 is a side elevation of a fuselage such as is used in the model of Figs. 3 and 4;

Fig. 20 is a side elevation of a flat strip used to simulate the silhouette of one of the twin booms of a certain type of airplane;

Fig. 21 is a side elevation of a member simulating a cabin or cockpit hood;

Fig. 22 is an elevation of a simulated rotary turret with two machine guns;

Fig. 23 is a side elevation of a simulated bomb;

Fig. 24 is a side elevation of a simulated machine gun turret;

Fig. 25 is a top plan view of the same;

Fig. 26 is a front elevation of a simulated landing gear assembly with dual wheels;

Fig. 27 is a side elevation of the same;

Fig. 28 is a front elevation of a landing gear assembly such as would be employed on models of small airplanes;

Fig. 29 is a top plan view of another type of fuselage;

Fig. 30 is a side elevation of the same;

Fig. 31 is an elevation of one of the plastic disks used to simulate a spinning propeller;

Fig. 32 is a side elevation of a simulated nacelle;

Fig. 33 is a bottom plan view of the same;

Fig. 34 is a side elevation of another nacelle;

Fig. 35 is a top plan view of the same;

Fig. 36 is a side elevation of another type of fuselage;

Fig. 37 is a top plan view of the same;

Fig. 38 is a side elevation of one of the twin booms, used in making the model of Fig. 1;

Fig. 39 is a top plan view of the same;

Fig. 40 is a side elevation of the fuselage member employed in the model of Fig. 1;

Fig. 41 is an elevation of a nose piece or tail piece for attachment to a fuselage;

Fig. 42 is a plan view of another horizontal stabilizer;

Fig. 43 is a bottom plan view of another form of wing tip;

Fig. 44 is a plan view of another form of horizontal stabilizer;

Fig. 45 is a side elevation of a landing gear strut which is adapted to be attached to and partly incorporated in a wing structure;

Fig. 46 is an edge or end elevation of the same;

Fig. 47 is a plan view of a wing element;

Fig. 48 is an elevation of a tie member for securing wing elements to each other and to a fuselage;

Fig. 49 is a plan view of another wing tip;

Fig. 50 is a top plan view of a simulated pontoon such as is used in the model of Figs. 3 and 4;

Fig. 51 is a side elevation of the same;

Fig. 52 is a side elevation of a simulated droppable fuel tank.

Except for Figs. 1 to 6a and Figs. 50, 51, which are half size, all the views of the drawings are full size. It should be understood, however, that many of the parts illustrated may be furnished in two or more sizes, and the pins of Fig. 17 are preferably in five or six different lengths, to facilitate the assembling of models of small or large wing span, varying from one motor up to six. Also, it should be made clear that the assemblies of Figs. 1 to 6a greatly exaggerate the joints between separate elements. In actual models, the joints are very inconspicuous and may be made invisible by careful fitting and finishing.

Referring particularly to the drawings, and first to Figs. 1 and 2, the two motored or medium bomber there shown is a wooden model assembled from a number of carved wood pieces or elements shown separately in other figures to be described in detail below. The model comprises a fuselage 101, wing sections 102 secured to the fuselage by means to be described, twin booms 103 secured to the outer ends of wing sections 102, short wing sections 104 which are carried by the twin booms, and wing tips 105 which are secured to the outer ends of wing sections 104. To the forward end of each of the twin booms a frusto-conical knob 106 is secured by a pin 107 having a rounded head 108 (Fig. 15). The knob 106 is shown separately in Figs. 14a, 14b, and is intended to simulate the nose of an airplane or nacelle having in-line engines, while the rounded head 108 of pin 107 simulates a propeller spinner. Pins 107 also have collars 109 on which flat, circular, plastic disks 110, having central perforations 110a, are mounted (see Fig. 31). These disks may be of polystyrene or of methyl methacrylate or other transparent plastic having a high index of refraction and reflecting light to simulate a spinning propeller.

The fuselage carries a cabin element 111 (Fig. 21) on its top, has a nose turret 112 (Fig. 22) with a pair of machine guns 113, and has a conical tail-piece 114 to streamline the rear end. This tail-piece is shown separately in Fig. 41, and may be mounted at either end of several of the fuselages and nacelles herein described. The rear ends of the twin booms 103 taper rather finely, having cut-away portions 115 on the inside to receive vertical stabilizers 116, shown separately in Fig. 18. Stabilizers 116 each have a cross slot 117, and a horizontal stabilizer 118 (shown separately in Fig. 44), has rounded, reduced ends 119 which are passed through slots 117 and through slots 120 which extend longitudinally of the boom but terminate short of the rear end thereof. See Figs. 38 and 39 for the boom construction. The horizontal stabilizer 118 will fit snugly in slots 117, 120 to hold the empennage firmly. Identical landing gear assemblies 121 (Fig. 2) are secured beneath the forward portion of the fuselage (to simulate a nose wheel) and beneath the twin booms. The landing gear assemblies 121 are described in detail hereinafter. A bomb 122, shown alone in Fig. 23, is carried on the underside of the fuselage.

To secure certain parts, wooden pins are used, said pins having slits at their opposite ends to facilitate insertion in holes or bores provided in the parts to be held together. One of the pins 123 is shown in Fig. 17 as having end slits 124. With a model like the one of Figs. 1 and 2, two pins 123 may be passed laterally through the fuselage 101 and through bores 102a in wing sections 102, also through booms 103, wing sections 104 and into the ends of wing tips 105. The pin-receiving holes 125 of wing tips 105 are shown in Figs. 7 and 8. The pins 107 are likewise slitted at their ends, as shown at 126 in Fig. 15, and pass through central bores 106a in knob 106 and into holes 128 in the center of the forward fuselage end (see Fig. 40). The tail-piece 114 is generally conical, with a flat face 114a (Fig. 41) and has a pin 129 projecting from said face and fitting in a hole 130 in the rear end of the fuselage. A turret exactly like nose turret 112 may be substituted for the tail-piece, and the fuselage would then have nose and tail turrets, simulating a more heavily armed bomber; or the fore and aft ends of the fuselage may both be fitted with end pieces like tail-piece 114, and the bomb 122 may be removed, whereupon the model will have the appearance of a twin-boomed transport airplane. If a turret is used, as shown, the guns may be put in various angular positions, since the turret 112 is movable about the axis of its pin 131 (Fig. 22).

Where only the silhouette of a twin-boomed plane is desired, a pair of the flat strips 135, one of which is shown in Fig. 20, may be substituted for the elongated boom structure 103. Said strips 135 each have two bores 136 properly spaced and dimensioned to receive the pins 123 which extend through the fuselage and wing sections as already explained. Slots 137 are in the tapered rear ends of strips 135 and are of proper size to receive the reduced ends 119 of horizontal stabilizer 118 (Fig. 44). The vertical stabilizers 116 are then held on the ends of stabilizer 118 against the flat sides of strips 135, as will be understood from Fig. 1, showing an entirely analogous arrangement. When strips 135 are used, no simulated engines or propellers are employed. A silhouette of an airplane is ordinarily shown in semi-darkness, and a propeller and engine would not be seen under such conditions.

The landing gear assembly 121 consists of a wooden pin 140 (Fig. 16) having a slit 141 in its upper end and a cross bore 142 near its lower end, said pin simulating a strut, a wheel 143 having an axial bore 144, and a headed and slitted pin 145 providing an axle for the wheel and frictionally fitting in cross bore 142 to hold the wheel on the strut. Wheel 143 has a rounded periphery to simulate an aircraft tire mounted on a wheel. In the event dual wheels are desired, as in assembling models of large planes, the landing gear assembly of Figs. 26 and 27 may be substituted for assembly 121. In these figures strut 146 has a slit 147 at its upper end, and a cross bore 148 at its lower end, with a pin 149 passed through cross bore 148 and serving as an axle and fastening means for dual wheels 150. Obviously, strut 146 (also strut 140, Fig. 16) may be furnished in various lengths, so that the landing gear may be attached to nacelles and wings as well as fuselages, and wherever attached, will support the model in the proper position. In Fig. 28, a landing gear assembly is shown comprising wheel 143, headed pin 145 (as in Fig. 16) and an angular strut 140a exactly like strut 140 except it is longer and has its lower end beveled as clearly shown. A pair of such assemblies would be employed in making a model of a small pursuit plane or dive bomber, or small pleasure aircraft, which frequently have divergent struts attached to the fuselage. Usually the landing gear assemblies will be removed when aircraft in flight are to be simulated, since most aircraft have retractable landing gear.

The model seaplane of Figs. 3 and 4 employs a fuselage 151 shown separately in Fig. 19. Except for narrow flattened areas 152 on opposite sides (only one being shown) and similar areas 153, 154 at the top and bottom, the fuselage 151 is circular in cross section from its squared off forward end 155 to its tapered tail. A narrow, vertical slot 156 extends from the tail end inwardly sufficiently far to accommodate a vertical stabilizer 157, shown separately in Fig. 12. Stabilizer 157 has a reduced portion 157a which snugly fits slot 156 and which also may be passed through a cross slot 158 in the center of a horizontal stabilizer 159 shown in Fig. 11. Shoulders 157b on vertical stabilizer 157 will lock the horizontal stabilizer on top of the rear end of fuselage 151. A knob 160 shaped to simulate a radial engine, and shown per se in Fig. 13, is held on the end 155 of fuselage 151 by means of a headed pin 107 (Fig. 15) which also supports the propeller disk 110. The inner end of pin 107 is received within a hole 155a located centrally of end 155 of the fuselage. A vertical bore 160a passing entirely through the fuselage may receive the bottom attaching pin 111a of a cabin element 111, or pin 161a of a gun turret 161 illustrated in Figs. 24 and 25. The wings of the model flying boat are shown as made from wing sections 102 (Figs. 9 and 10) which are abutted against flattened areas 152 of fuselage 151, and shorter wing sections 162 which are exactly like wing sections 102 except they are only about half as long. All these wing sections are symmetrical and hence are reversible, which facilitates assembly. Flattened areas 152 have the shape and size of the ends of the wing sections. To the ends of wing sections 162, wing tips 105 are attached, said wing tips being shown per se in Figs. 7 and 8. A pair of wooden pins (not shown, but like the pin 123 of Fig. 17) pass through central transverse bores 164 in the fuselage 151 (Fig. 19) and through the long and short wing sections and into holes 125 at the inner ends of the wing tips 105. It will be observed that the wings are so positioned as to form a mid-wing model. Pontoons 165, shown per se in Figs. 50 and 51, are secured below the fuselage by one or more pins 166 extending into diagonal holes 167 in the pontoons and diagonal holes 168 in the fuselage 151. Vertical bores 167 in the pontoons permit attachment of the same directly beneath a fuselage, nacelle or wing, which may be desired in other models. A bomb (Fig. 23) or simulated droppable tank 169 (see Fig. 52) or other element may be frictionally secured in the lower end of vertical bore 169a in fuselage 151.

Referring to Figs. 34 and 35, a fuselage or nacelle member 170 is shown as having parallel cut-outs 171 extending lengthwise of the member and providing a rib 172 having spaced lateral bores 173 for wing-attaching pins as already described. The fuselage 170 also has parallel flattened areas 174 on opposite sides, and lateral bores 175 extending between said flattened areas. Vertical bores 176 may extend downwardly from the shoulder provided by one of the cut-outs 171. These cut-outs are designed to receive and fit snugly around the ends of wing sections such as those shown in Figs. 9 and 10. A bore 177, located centrally of the squared-off end 178 of fuselage 170, may receive a mounting pin like the one shown in Fig. 15, whereby a simulated engine (Fig. 13) or turret (Fig. 22) may be carried at that end. The rear end of the fuselage is streamlined, as shown. If the wing sections are secured to opposite sides of rib 172, and the fuselage is turned through 180°, the model may be converted from a high wing to a low wing airplane. The flattened areas 174 also permit wing sections to be abutted against them and secured by pins passing through bores 175 to form a mid-wing model. The cut-outs 171 may, of course, be closed by fillers (not shown) secured by pins entering bores 176 if a smooth contoured fuselage for a mid-wing plane is considered desirable. The fuselage of Figs. 34 and 35 is small compared to the fuselages of Figs. 19 and 30, for example, and hence is well adapted for simulating the fuselages of certain small airplanes.

The fuselage 180 shown in Figs. 36 and 37 is obviously like the nacelle 170 just described, but is larger and has both ends squared off, and bores 181, 182 are centrally located in the opposite ends. The fuselage 180 clearly may be employed for a high wing, low wing or mid-wing model. When a high wing model is formed, bore 183, shown as extending inwardly from the bottom, may secure a turret (Figs. 24 and 25) or a bomb (Fig. 23) or a droppable tank (Fig. 52); but if the fuselage is inverted, to bring bore 183 to the top, a cabin (Fig. 21) or turret may be attached. Aligned bores 184 extending from the top and bottom toward each other near one end may facilitate the attachment of a nose wheel or other alighting gear element. If bores 184 are not to be used, either end of fuselage 180 may be the forward end, which is an advantage in assembling. The opposite sides of the fuselage 180 are provided with flattened areas 180a corresponding to areas 174 of Figs. 34 and 35. Thereabove the fuselage is recessed at 180c, which recesses are separated by a rib formation 180d. Wing connecting pins are adapted to pass through the fuselage by virtue of the cross bores 180b and 180e.

Two booms 103 (Figs. 38 and 39) are incorporated in the model of Figs. 1 and 2, as already explained. It is apparent that the booms 103 are identical, except that the cut-away portions 115 face inwardly, or are opposed, to receive vertical stabilizers 116. Each boom has a bore 185 at its forward end to receive the propeller-mounting pin 107, as described. Each boom is cut away or recessed, as at 186, 187, to receive the ends of wing sections 102, 104 on opposite sides, with a longitudinal rib 188 between the recesses. Bores 189 extend laterally through each rib 188, and other lateral bores 190, parallel to bores 189, are located half way between the top and bottom of each boom. Bores 189, 190 are provided for the pins 123, which hold the booms and wing sections together, as previously explained. The landing gear assemblies 121 are secured by insertion of the upper ends of the struts in bores 191 extending upwardly from the bottom of the booms 103, see Fig. 2. The booms each have flattened areas 192 on opposite sides, midway between the top and bottom and parallel to each other (lying in vertical planes) to permit abutting wing sections against the booms as when a mid-wing model is desired. The foregoing description of other mid-wing models will make clear what is meant. The booms 103 may therefore be parts of high wing, mid-wing or low wing models.

Fig. 40 shows in greater detail the fuselage 101 of the airplane of Fig. 1. This fuselage has both ends squared off (as in the form of Figs. 36 and 37) but does not have cut-away recesses for the wing ends. Instead, flattened areas 193 are on opposite sides (only one being shown) with transverse bores 194 for the assembling pins 123, which hold wing sections abutted against said flattened areas. A small bore 195 extends laterally from top to bottom to permit securing a cabin, turret, bomb or other element as previously explained. A bore 196 near one end extending vertically upwardly may secure the upper end of a strut of a landing gear assembly. Bores 128, 130 extending centrally into the opposite ends of the fuselage permit the assembling thereon of simulated engines, turrets and other elements, as has been made plain. The transverse wing attaching pins 123 as described for attaching the wings to the fuselage in Fig. 1, as well as in other instances such as Figs. 29, 30 and 34 to 39, may be replaced by transverse tie rods 210 (Fig. 48), to be described below. These tie rods having threaded members 213 on the opposite ends thereof provide more permanent and secure transverse connecting members than do the pins 123 of Fig. 17.

Now referring to Figs. 5 and 6, the incomplete model airplane there shown comprises a fuselage 200 which is made of a plurality of plies of wood or similar material, these plies being of different dimensions and forms so that when assembled they form a rough approximation of the desired final contour of the fuselage. The central ply 201 is the largest and includes a vertical tail or stabilizer 201a. Intermediate plies 202, 202a, 203, 203a are progressively smaller but have a complementary form, while the outside ply 204 is of least size. The wings are made up of a plurality of wing elements 205 (shown separately in Fig. 47), each being a narrow segment of a wing, with a hole 206 in the center and holes 207, 208 equally spaced on either side, all the holes being of the same size. A pair of straight pins 209 are passed through the holes 207, 208 in the wing elements and a tie rod 210 (having screw threads 211 at each end, see Fig. 48) is passed through the central holes 206. Both pins 209 and tie rod 210 pass transversely through the fuselage 200. Wing tip members 212 (Fig. 49) are secured by tie rod 210 to the outer ends of the assemblies of wing elements 205, and nuts 213, threaded on screw threads 211, draw the parts tightly together to hold the wing assemblies firmly on the fuselage. It will be noted that nuts 213 are rounded and are not much larger in diameter that the thickness of the wing tip members 212, which have openings 214 to receive said nuts, and bores 215, 216, 217 to receive the ends of pins 209 and tie rod 210. The described tie rod and nuts obviously lock or clamp the fuselage and wings together, and in this respect the model of Figs. 5 and 6 differs from the other models. In lieu of wing tip members 212, the wing tips 212a (Fig. 43) may be used. Wing tips 212a have openings 212b for nuts 213, and bores 212c, 212d, 212e for pins 209 and tie rod 210, also holes 212f for attachment for landing gear struts. Interposed between any two wing elements 205 or between a wing element 205 and wing tip member 212 or 212a, is a landing gear strut member 218 having an upper part 218a shaped exactly like one of the wing elements 205, and a leg 218b at right angles to provide the strut proper. Holes 219, 220, 221 register with the similar holes in the wing elements and wing tip members, hence, receive the tie rod and pins to lock the member 218 into the wing structure. At its lower end, leg 218b has a bore 218c for a wheel-supporting pin like the one shown in Fig. 16. Instead of wheels, small floats similar to the pontoons of Figs. 50, 51 may be pinned to the lower ends of struts 218b. The landing gear members 218 may also be assembled with other models of airplanes. In lieu of a multiplicity of wing elements 205, the model builder may use a single wing member 102 (Figs. 9 and 10) provided there are three bores for pins 209 and tie rod 210. If desired, only two bores need be supplied, as a single pin 209 will prevent rotation of the elements about tie rod 210 as an axis, and the nuts on the tie rod provide adequate tightening means. While the tie rod and nuts may be of wood or a plastic, where long life is a desideratum, brass or other nonrusting metals may be employed for these parts.

The empennage of the laminated model, Figs. 5 and 6, comprises a horizontal stabilizer 222, shown separately in Fig. 42, having a central cross slot 223, which interlocks with a slot (not shown) in vertical stabilizer 201a which is an integral part of ply 201. Stabilizer 222 is then locked immovably on the tail 201a. A cabin element 224 is secured by a pin 225 to the central ply 201, which has a cut-out 201b for this purpose.

The purpose of the shaped laminations for the fuselage 200 is two-fold: first, to give the youth having the set an opportunity to exercise his skill in wood-working, and second, to guide him while working so that he cannot obtain a markedly poor result. Figs. 5 and 6 show the steps 226, 227 of a seaplane, which are much more easily made because the outlines of the plies suggest how the cutting and shaping should be accomplished. Furthermore, final shape is attained with a minimum waste of material, as the plies are formed complementary to each other. In a similar manner, unusual wing structures such as gull wings, nacelles and other aircraft parts may be assembled from laminations and then shaped. Proper assembly of the plies will be facilitated by numbering or otherwise marking the plies. Ordinarily, the plies will be glued together before wood-working is begun. With proper selection of the plies, the contour of any fuselage or other part may be closely simulated.

Referring to Figs. 29 and 30, still another fuselage member 230 is there shown. Here the fuselage has longitudinal cut-outs 231 for wing ends, and lateral bores 232 in rib 233, with lateral bores 234 directly below and parallel to bores 232 and extending between parallel flattened areas 235. The forward end 236 of the fuselage is squared off, and has a central bore 237 to receive different parts, as already explained, and adjacent said end there are bores 238, 239 extending vertically to receive the end of a landing gear strut, whether the fuselage be upright, as shown (for a high wing model) or inverted, for a low wing model. A slot 240 at the tapered rear end of the fuselage may receive a stabilizer, as described above. Another nacelle member 241 is shown in Figs. 32 and 33, and has a streamlined form with a squared off forward end 242 with a central bore 243 to receive an engine-simulating knob, etc. Parallel flattened areas 244 on opposite sides, with bores 245 extending laterally between said areas, facilitate the attachment of wing sections as previously described. Bores 246 are provided for landing gear struts. It will be clear that nacelles 241 are useful only for mid-wing models.

Because of the tendency of many woods to warp and crack and splinter when bored, plywood or fabricated board similar to Masonite may sometimes be employed for making parts of the sets. If wood is used, white pine or similar soft, easily shaped wood is preferred. The model builder will at times desire to bore additional holes in some of the parts to change the relative positions thereof or to add new elements, or slight changes may be preferred in the shapes of the stabilizers and other members, to make them more closely simulate the corresponding parts of a real airplane. When any minor changes are to be made, with a material like white pine, they are easily made with a gimlet, a penknife and sandpaper. The flattened areas on the different fuselages and nacelles are best formed by turning a square piece of wood in a lathe and cutting away all the original surface except where the flattened areas are desired.

It will be noted that the illustrated models and elements do not include rudders, ailerons, trimming tabs, diving brakes, lights, antennas and the like. Such parts are unimportant where aircraft recognition or spotting is the objective. Some of these parts may be simulated by paint; others may be left to the ingenuity of the owner of the set to supply by hand-made parts. As new aircraft appear, each with a different contour, appropriate changes may be easily made in the model elements to facilitate assembling models imitating the new aircraft. As the wings may be high, low or mid-wing, the propellers may be pusher or tractor, the engines may be in-line or radial, the nacelles may be varied in form and in position, the tail structures may be varied, the landing gear may be shifted or changed, it is possible to build several thousand different airplane models from a single set of model parts, even without altering the elements as furnished. Obviously many changes may be made in the set, within the scope of the appended claims.

What I claim is:

1. A model airplane structure comprising, in combination, a boom member having a tapering rear end; said rear end having a horizontal slot and being cut away vertically to provide a recess on one side of the boom; a vertical stabilizer element fitting in said recess and having a cross slot; and a horizontal stabilizer having one end reduced in width and passed through the cross slot in the vertical stabilizer and through the horizontal slot in the rear end of the boom, to thereby lock the vertical stabilizer on the boom and to support the horizontal stabilizer by the boom.

2. A fuselage or nacelle member for model airplanes consisting of a unitary solid block having flattened areas on opposite sides faciltating attachment of wing sections, and transverse bores extending between said flattened areas; the upper part of the block having longitudinal recesses with a rib between the recesses, said rib having transverse bores; the recesses being shaped to receive and seat the ends of wing sections, whose extremities abut the rib on either side, thereby to form a high wing model of airplane; said flattened areas being so shaped that the same wing sections may be abutted against them to form a mid-wing model; the fuselage or nacelle member being reversible through 180° to form a low wing model.

3. The invention according to claim 2, wherein the fuselage or nacelle member has at least two parallel transverse bores extending between said flattened areas, and the rib has at least two parallel transverse bores; the wing sections having each at least two bores which are parallel to the wing axis; and pins adapted to pass through all of said bores to lock the wing sections to the fuselage or nacelle in different positions to form high wing, mid wing or low wing models.

4. A model airplane comprising, in combination, a fuselage having a slot therein; a vertical stabilizer having a reduced portion on its lower end mounted in said slot and providing two shoulders which extend longitudinally of and rest upon the airplane fuselage, and a horizontal stabilizer having a slot through which the reduced end of the vertical stabilizer is passed, with the two shoulders lying above and interlocking with the horizontal stabilizer.

5. A model airplane structure comprising a body member consisting of a unitary block having substantially parallel flattened areas on opposite sides facilitating attachment of wing sections, the upper part of the block having longitudinal recesses with a longitudinal rib between the recesses, the recesses being shaped to receive and seat the inner ends of the wing sections whose extremities abut the rib on either side, whereby to form a high wing model of airplane, said flattened areas being so shaped that the same wing sections may be abutted against them to form a mid-wing model, and the body member being reversible through 180° to form a low wing model, and means for detachably securing said wing sections to said body member.

6. Landing gear for model airplanes comprising, in combination, a strut pin whose upper end is adapted to be inserted in a bore in some part of the model airplane; the lower end of the pin being beveled and having a cross bore extending normal to the beveled surface of the pin and at an obtuse angle to the longitudinal axis of the pin; a wheel having a central bore; and a pin serving as an axle for the wheel, being received in the central bore thereof and frictionally fitting the cross bore in the pin, to hold the parts assembled with the strut pin extending at an acute angle with respect to the plane of the wheel and with the central portion of the wheel adjacent to the beveled surface of the pin.

7. A model airplane structure comprising, a body member consisting of a unitary block having substantially parallel flattened areas on opposite sides facilitating attachment of wing sections, the upper part of the block having longitudinal recesses with a longtiudinal rib between the recesses, the recesses being shaped to receive and seat the inner ends of the wing sections whose extremities abut the rib on either side, whereby to form a high wing model of airplane, said flattened areas being so shaped that the same wing sections may be abutted against them to form a mid-wing model, and at least one tie rod having threaded ends extending through said body member and also extending longitudinally through a portion of each of two oppositely extending wing sections, and nut members on the opposite threaded ends of said tie rod and located in nut receiving recesses in the wing sections at a distance outboard of the body member.

8. A model airplane structure comprising, a body member consisting of a unitary block having substantially parallel flattened areas on opposite sides facilitating attachment of wing sections provided with flat end faces at the root ends thereof adapted for abutting engagement with said flattened areas at opposite sides of said unitary block, and at least one tie rod having threaded ends extending through said body member within the confines of said flattened areas and also extending longitudinally through a portion of each of two oppositely extending wing sections, and nut members on the opposite threaded ends of said tie rod and located in nut receiving recesses in the wing sections at a distance outboard of the body member.

9. A model airplane structure comprising, in combination, a pair of spaced apart boom members extending generally parallel and each having a tapered rear end; each of said tapering rear ends having a horizontal slot and being cut away vertically to provide a recess on one side of each boom with said recesses facing toward each other; a vertical stabilizer element fitting each of said recesses and each provided with a cross slot registering with the respective horizontal slots; and a horizontal stabilizer element extending across the space between said boom members and having each end reduced in width and passed through the cross slots in the vertical stabilizer elements and through the horizontal slots in the rear ends of the boom members, to thereby lock the vertical stabilizer elements on the respective boom members and to support the horizontal stabilizer element by the boom member.

HOWARD M. McCOY.

REFERENCES CITED

The following references are of record in the file of this patent:

UNITED STATES PATENTS

| Number | Name | Date |
|---|---|---|
| 1,321,109 | Lasares | Nov. 11, 1919 |
| 1,674,637 | Conway | June 26, 1928 |
| 1,678,602 | Oldfield | July 24, 1928 |
| 1,935,533 | Wilmot et al. | Nov. 14, 1933 |
| 2,059,131 | McGall | Oct. 27, 1936 |
| 2,366,652 | Rieger | Jan. 2, 1945 |